(12) United States Patent
Divigalpitiya et al.

(10) Patent No.: US 8,178,241 B2
(45) Date of Patent: May 15, 2012

(54) ELECTRODE INCLUDING CURRENT COLLECTOR WITH NANO-SCALE COATING AND METHOD OF MAKING THE SAME

(75) Inventors: Ranjith Divigalpitiya, London (CA); Mary I. Buckett, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 900 days.

(21) Appl. No.: 12/200,044

(22) Filed: Aug. 28, 2008

(65) Prior Publication Data

US 2010/0055569 A1    Mar. 4, 2010

(51) Int. Cl.
*H01M 4/13*    (2010.01)
(52) U.S. Cl. .................... 429/231.4; 429/231.5; 429/213
(58) Field of Classification Search ............... 429/231.5, 429/231.4
See application file for complete search history.

(56) References Cited

U.S. PATENT DOCUMENTS

| | | | |
|---|---|---|---|
| 2,310,002 A * | 2/1943 | Emmens et al. ............ 438/102 |
| 336,926 A | 2/1968 | Burns et al. | |
| 3,836,466 A * | 9/1974 | Abe et al. ................ 508/129 |
| 417,306 A | 11/1979 | Kinsman | |
| 547,867 A | 12/1995 | Turi et al. | |
| 564,369 A | 7/1997 | Barker et al. | |
| 6,403,263 B1 | 6/2002 | Roach | |
| 6,511,701 B1 * | 1/2003 | Divigalpitiya et al. ....... 427/11 |
| 6,544,688 B1 | 4/2003 | Cheng | |
| 6,844,114 B2 | 1/2005 | Gauthier et al. | |
| 7,029,796 B2 | 4/2006 | Choi et al. | |
| 7,327,556 B2 | 2/2008 | Ro et al. | |
| 7,348,102 B2 | 3/2008 | Li et al. | |
| 7,388,740 B2 | 6/2008 | Ro et al. | |
| 2001/0046081 A1 * | 11/2001 | Hayashi et al. ............ 359/296 |
| 2003/0152835 A1 | 8/2003 | Dasgupta et al. | |
| 2004/0048157 A1 * | 3/2004 | Neudecker et al. ........ 429/231.2 |
| 2004/0126663 A1 | 7/2004 | Sudano et al. | |
| 2004/0248010 A1 | 12/2004 | Kato et al. | |
| 2005/0098437 A1 * | 5/2005 | Shiepe ....................... 205/109 |
| 2005/0181241 A1 * | 8/2005 | Edwards ................... 428/839.2 |
| 2005/0231893 A1 | 10/2005 | Harvey | |
| 2006/0032045 A1 | 2/2006 | Naarmann et al. | |
| 2006/0099510 A1 | 5/2006 | Naarmann et al. | |
| 2007/0059599 A1 | 3/2007 | Rubino et al. | |
| 2007/0172739 A1 | 7/2007 | Visco et al. | |
| 2007/0202403 A1 | 8/2007 | Oh et al. | |
| 2007/0231688 A1 | 10/2007 | Grugeon et al. | |

FOREIGN PATENT DOCUMENTS

DE    10328572    1/2005
(Continued)

OTHER PUBLICATIONS

International Search Report, PCT/US2009/054117, PCT/ISA/210.

(Continued)

*Primary Examiner* — Barbara Gilliam
*Assistant Examiner* — Gary Harris
(74) *Attorney, Agent, or Firm* — Stephen F. Wolf

(57) ABSTRACT

Current collectors and methods are provided that relate to electrodes that are useful in lithium polymer electrochemical cells. The provided current collectors include a metallic substrate, a substantially uniform nano-scale carbon coating, and an active electrode material. The coating has a maximum thickness of less than about 200 nanometers.

9 Claims, 2 Drawing Sheets

FOREIGN PATENT DOCUMENTS

| | | |
|---|---|---|
| EP | 1 662 592 A1 | 5/2006 |
| JP | 10106585 | 4/1998 |
| JP | 11250900 | 9/1999 |
| WO | WO 94/05430 A1 | 3/1994 |
| WO | WO 2008/047324 A2 | 4/2008 |
| WO | WO 2011/112589 A1 | 9/2011 |
| WO | WO 2011/112598 A1 | 9/2011 |

OTHER PUBLICATIONS

"Kirk-Othmer Encyclopedia of Chemical Technology", Wiley InterScience®, Copyright © 1994 by John Wiley & Sons, Inc., pp. 1-11.

"Optimization of carbon coatings on LiFePO4", Marca M. Doeff et al., Science Direct, Journal of Power Sources, vol. 163, Issue No. 1, Dec. 7, 2006, pp. 180-184. [available online Jan. 6, 2006] [Retrieved from the internet on Jul. 9, 2008] pp. 180-184 http://www.sciencedirect.com/science?_ob=ArticleListURL&_method=list&_ArticleListID=894733554&view=c&_acct=C000000453&_version=1&_urlVersion=0&_userid=1592960&md5=5af39f14e730cac3e689a88d4ba53e28.

CRC Handbook of Chemistry and Physics, 1984 CRC Press, $64^{th}$ Edition, pp. F20.

* cited by examiner

ELECTRODE INCLUDING CURRENT COLLECTOR WITH NANO-SCALE COATING AND METHOD OF MAKING THE SAME

FIELD

Provided are current collectors that relate to electrodes that are useful in lithium polymer electrochemical cells.

BACKGROUND

Secondary electrochemical cells, such as lithium polymer or lithium-ion electrochemical cells are constructed with electrodes that include current collectors. In a typical electrode for such electrochemical cells, an electroactive material is adhered to and in electrical contact with a current collector. Current collectors are typically electrically-conductive metallic strips. The metallic strips can include a conductive coating that enhances electrical contact with the current collector and provides corrosion protection thereto.

SUMMARY

There is a need for low cost, electrodes with current collectors that can enable the production of electrochemical cells with increased specific energy density, which are low cost, and can be made with a minimum use of solvents. There is also a need for a method of making these electrodes and current collectors used therein.

In one aspect, provided is an electrode for a lithium polymer electrochemical cell that includes a current collector comprising a metallic substrate, a substantially uniform nano-scale carbon coating, and an active electrode material, wherein the coating has a maximum thickness of less than about 200 nanometers.

In another aspect, provided is a method of making a current collector that includes providing a metallic substrate and coating the substrate with a dry composition including particles, wherein coating the substrate comprises buffing an effective amount of said particles on said substrate at a pressure normal to the surface of greater than 0 and less than about 30 g/cm² using an applicator pad, said applicator pad moving in a plane parallel to said surface in a plurality of directions relative to a point on the surface such that a substantially uniform coating of said particles is provided, and wherein said particles have a Mohs' hardness between 0.4 and 3.0 and a largest dimension of less than about 100 microns.

In some embodiments lithium polymer electrochemical cells are provided that include the provided electrodes and current collectors. In some embodiments the current collectors include aluminum and the uniform coating includes graphite. In other embodiments the current collectors can include buffing aids. In other embodiments, the current collector can include a coating that includes a binder, such as, for example, polyvinylidene fluoride.

In this application:

"active material" refers to a material that can electrochemically react with lithium.

"current collector" refers to a metallic substrate that can be coated with a nonactive, conductive material; and "nano-scale" refers to features of less than about 500 nanometers in the largest dimension.

The details of one or more embodiments are set forth in the accompanying description below. Other features, objects, and advantages will be apparent from the description and from the claims.

BRIEF DESCRIPTION OF THE FIGURES

FIGS. 1a and 2b are scanning electron micrographs (SEM) of cross-sectional views of provided electrodes.

DETAILED DESCRIPTION

Figure 1A:
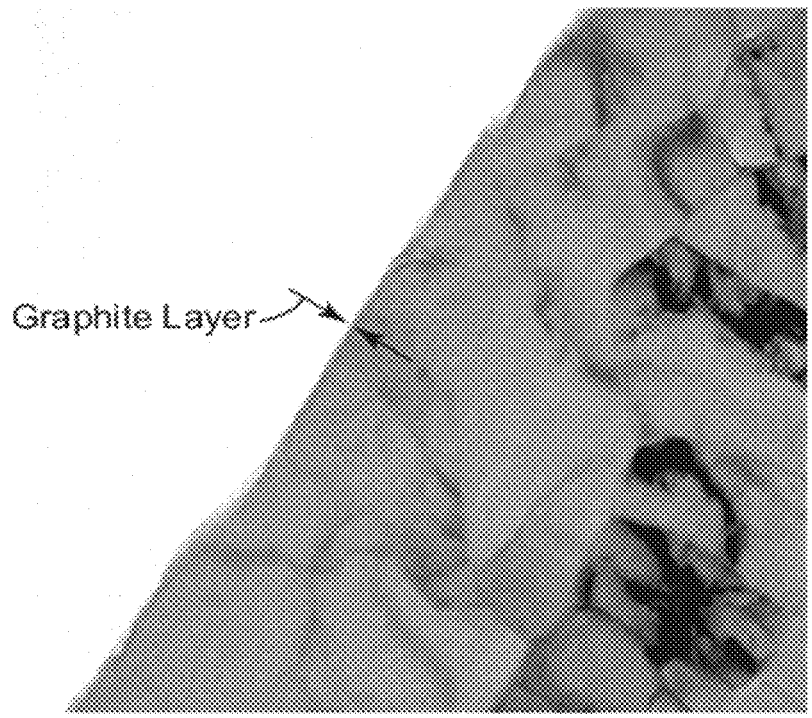

In the following description it is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Lithium polymer electrochemical cells, known more commonly as lithium polymer batteries, are rechargeable batteries in which the lithium-salt electrolyte is not held in an organic solvent as in the lithium-ion electrochemical cell. Rather, the electrolyte is in a solid polymer composite such as polyethylene oxide or polyacrylonitrile.

The provided electrodes for a lithium polymer electrochemical cell include a current collector. The current collector includes a metallic substrate that can include any highly conductive metal that is known by those of skill in the art to be useful in electronic applications. Exemplary metals include aluminum, copper, magnesium, nickel, tin, and alloys thereof.

The provided electrodes also include a substantially uniform nano-scale carbon coating that has a maximum average thickness of less than about 500 nanometers, less than about 200 nanometers, less than about 100 nanometers, or even less than about 50 nanometers. For the provided electrodes, "uniform" means having a relatively consistent thickness of coating over the desired dimension of the plane of the substrate. The uniformity of the coating may be evaluated, for example, by optical evaluation using an optical spectrometer. To evaluate uniformity, a reflectance reading is taken at six points and compared to determine the variation. Typically the variation is no more than 10%, no more than 5%, or even no more than 3%. The wavelength to be evaluated is dependent on the physical properties of the coating and of the substrate and is appropriately selected to accurately assess the uniformity of the coating. For example, a coating that is visible under ordinary light conditions is evaluated using a wavelength of light in the visible range, such as 550 nm, the generally accepted midpoint of the visible light wavelength spectrum.

The carbon coating can be applied as a dry composition (with substantially no solvent present). An exemplary process for applying the carbon coating as a dry composition can be found, for example, in U.S. Pat. No. 6,511,701 (Divigalpitiya et al.). This process, which is described later in more detail, can provide very thin, nano-scale coatings of carbon on metallic substrates.

The dry composition can include carbon and additional components. The carbon can be any form or type of carbon. Exemplary carbon useful in the provided electrodes include conductive carbons such as graphite, carbon black, lamp black, or other conductive carbon materials known to those of skill in the art. Typically, exfoliatable carbon particles (i.e., those that break up into flakes, scales, sheets, or layers upon application of shear force) are used. An example of useful exfoliatable carbon particles is HSAG300, available from Timcal Graphite and Carbon, Bodio, Switzerland. Other useful materials include, but are not limited to SUPER P and ENSACO (Timcal).

The dry composition can also include a binder. The binder can function to improve adhesion to the composition to the substrate. Any binders known to those of skill in the art of making electrodes for lithium batteries can be used. Typical binders that can be useful in the provided electrodes include polyvinylidene fluoride, polyimide, poly(acrylic acids), poly(styrenesulfonates), polycarboxylic acids and their lithium salts. An exemplary binder that can be useful is KYNAR 741 (polyvinylidene fluoride), available from Arkema, Oakville, Canada.

Surprisingly and advantageously, provided electrodes can be made that include a current collector that is substantially free of a binder. A material can act as a binder if it is the means of attaching the particle to the substrate. Thus, a composition to be coated is considered substantially free of a binder if 20 g of the composition stored for 3 days at a temperature of 25° C. and relative humidity of 40% does not agglomerate (i.e., a powder in a vial would not flow freely).

Mixtures of the above materials can also be buffed to form coatings of desired characteristics. By varying the proportion of the constituents in the mixture very dramatic changes in the surface properties can be obtained. For example, with a mixture of graphite and polyvinylidene difluoride, surface resistance can be varied from $10^3$ ohms/square to $10^{11}$ ohms/square by varying the ratio of the materials. As the above example shows, one can prepare electrically insulating, electrostatic dissipating or electrically conducting coating with the mixture just by varying the composition easily.

Typically, adherence of the coating to the substrate is assisted by heating the substrate after the buffing operation to a temperature such that the adhesion of the coating is enhanced. For example, if the coating includes a polyvinylidene fluoride (PVDF) binder, the substrate can be heated to a temperature of at least 175° C. for a period of at least 5 minutes. The coated substrates of the present invention can exhibit an amazingly uniform appearance, and surprisingly the coatings applied with the low energy process as described herein are highly adherent to the substrate. The adherence of the coating to the substrate preferably is such that, after the heat treatment or aging, a piece of 3M Scotch brand premium grade transparent cellotape 610 applied and pressed according to ASTM D-3359 to the surface of the coated substrate with a 4.5 lb (20 Newtons) roller pressure will not remove the coating material as evaluated by unaided eye visual inspection.

The provided current collectors can be conductive. Conductivity is typically expressed as sheet resistance. The lower the sheet resistance, the higher the conductivity. The provided current collectors can have a sheet resistance of less than about 300 ohms/square, less than about 200 ohms/square, less than about 100 ohms/square, or even less than about 50 ohms/square. The provided current collectors can be used to make electrodes that are useful in lithium polymer electrochemical cells. Typically, they are useful in making cathodes. For cathodes, useful active materials include $LiFePO_4$, $VO_2$, and combinations thereof. It is contemplated that the provided current collectors can also be used to make anodes or other cathodes useful in lithium polymer electrochemical cells. A particularly useful current collector comprises a metallic substrate and a uniform nano-scale carbon coating, wherein the carbon coating consists essentially of graphite.

In another aspect, provided is a method of making a current collector. The method includes providing a metallic substrate. The metallic substrate can include any highly conductive metal that is known by those of skill in the art to be useful in electronic applications. Exemplary metals include aluminum, copper; magnesium, nickel, and tin.

The provided method also includes coating the substrate with a dry composition including particles, wherein coating the substrate comprises buffing an effective amount of said particles on said substrate at a pressure normal to the surface of greater than 0 and less than about 30 $g/cm^2$ using an applicator pad, said applicator pad moving in a plane parallel to said surface in a plurality of directions relative to a point on the surface such that a substantially uniform coating of said particles is provided, and wherein said particles have a Mohs' hardness between 0.4 and 3.0 and a largest dimension of less than about 100 microns. For the provided method, "dry" means substantially free of liquid. Thus, in the provided process the composition is provided in a solid form, rather than in a liquid or paste form. Surprisingly it has been found that the use of dry particles that are not provided in a liquid or paste format is essential to obtaining this uniformity, because non-uniformity is introduced by evaporation of the liquid carrier of liquid or paste compositions.

Mohs' hardness is a scale indicating the hardness of a material. The hardness of the particles of the present invention is established as the Mohs' scale hardness of the material in bulk. Mohs' hardness values are widely reported in the literature, including the CRC *Handbook of Chemistry and Physics*, and the Kirk-Othmer *Encyclopedia of Chemical Technology*. Particles of a material having a Mohs' hardness between 0.4 and 3.0 are considered to be "buffable" for purposes of the present invention.

In the provided method, the buffing pad can be moved in the plane of the substrate parallel to the substrate surface. The orbital motion of the pad in the present invention can be carried out with its rotational axis perpendicular to the substrate or web. Thus, the pad can move in a plurality of directions during the buffing application, including directions transverse to the direction of the web in the case where the web is moving past the buffing pad.

A typical process is characterized by the following: a clutched off-wind station for a roll of base material, a powder feed station that presents materials to be buffed onto the web base material, a buffing station, a pacer drive station which drives the web at a regulated speed, and a clutch driven take-up roll. The system can also include various directing and idler rolls and can also include a post-buffing wiping apparatus to clean excess materials on the buffed web surface. The system may also include a thermal device to improve fusing of materials buffed to the web. Also the system may include a vacuum cleaning station or stations to remove any excess powder material left on the coating or the substrate.

Surprisingly, it has been found that very thin coatings of substantially dry particles may be obtained by buffing the particles on a metallic substrate at a pressure of less than about 30 $g/cm^2$ with an applicator which moves in an orbital fashion (preferably random orbital fashion) parallel to the surface of the substrate. This buffing operation can be carried out at a temperature below the softening temperature of the substrate.

Applicator pads for use in the present invention may be any appropriate material for applying particles to a surface. For example, applicator pads may be woven or non-woven fabric or cellulosic material. Alternatively, the pads may be a closed cell or open cell foam material. In yet another alternative, the pads may be brushes or an arrays of bristles. Typically, the bristles of such brushes have lengths of about 0.2-1.0 cm, and diameters of about 30-100 microns. Bristles are preferably made from nylon or polyurethane. Preferred buffing applicators include foam pads, EZ PAINTR pads (described in U.S. Pat. No. 3,369,268), lamb's wool pads, 3M PERFECT IT pads, and the like. The buffing applicator moves in an orbital pattern parallel to the surface of the substrate with its rotational axis perpendicular to the plane of the substrate. The buffing motion can be a simple orbital motion or a random orbital motion. The typical orbital motion used is in the range of 1,000-10,000 orbits per minute.

The thickness of the buffed coating can be controlled by varying the time of buffing. Generally, the thickness of the coating increases linearly with time after a certain rapid initial increase. The longer the buffing operation, the thicker the coating. Also, the thickness of the coating can be controlled by controlling the amount of powder on the pads used for buffing. The present continuous web process can be capable of producing coatings with unique characteristics that offer substantial utility to many markets. The process involves application of powder materials to a web base substrate with a lateral "buffing" action. Coatings thus produced may have various electrical, optical and decorative features. For example, the provided method can be used to produce current collectors for lithium polymer batteries. Surprisingly, high quality thin coatings can be consistently prepared by this simple, dry, solventless process.

Coatings of graphite with megaohm/square range of surface resistance can be made conveniently with the method disclosed. Such thin semi-transparent conducting coatings are difficult to manufacture with consistent properties with physical vapor deposition and other similar methods. For example, such graphite coatings can be used in microwave applications, optical applications and certain electrical applications such as for components of electrodes for lithium electrochemical cells.

To make the provided current collectors, an electric orbital sander such as Black and Decker model 5710 with 4000 orbital operations per minute and a concentric throw of 0.254 cm (0.508 cm overall) may be used. Preferably, the concentric throw of the pad is greater than about 0.013 cm (0.254 cm overall). Instead of an orbital sander an air powered one may be used as well. The sander can have a rectangular orbital pad of approximately 8.9 cm×15.25 cm. On the web buffing operation the web is moved with the shorter side of the buffing pad parallel to web direction. Thus, the 15.25 cm length of the buffing pad is transverse to the machine direction. Alternatively, a stationary pad may be mounted between the orbital pads and the powder dispenser. With a stationary pad, the dispensed powder can be applied onto the web quickly before the powder has had a chance to move around, assuring that the excess powder is kept on the substrate.

The application of heat energy to the buffed web can improve the bonding of some of the materials applied to varying base materials. A 1000-watt radiant heater can be used to heat the substrate during buffing. Other methods of heat input to the web can also be utilized such as an oven or a heated platen in contact with the substrate. Many webs that are buff-coated result in being conductive on their surfaces. Direct application of electrical currents to conductive webs will also produce the desired heating affect, providing high efficiency heating because the energy is generated in the coating itself, directly at the desired point of application. The actual current draw of this heating process is a direct readout of the conductivity of the web and can be used for process monitoring and control. For a conductive coating such as graphite, any method that specifically heats the conductive layer can also be employed. For example, microwave or radio frequency ("RF") energy may be used to heat the conductive layer for fusing.

Figure 1B:
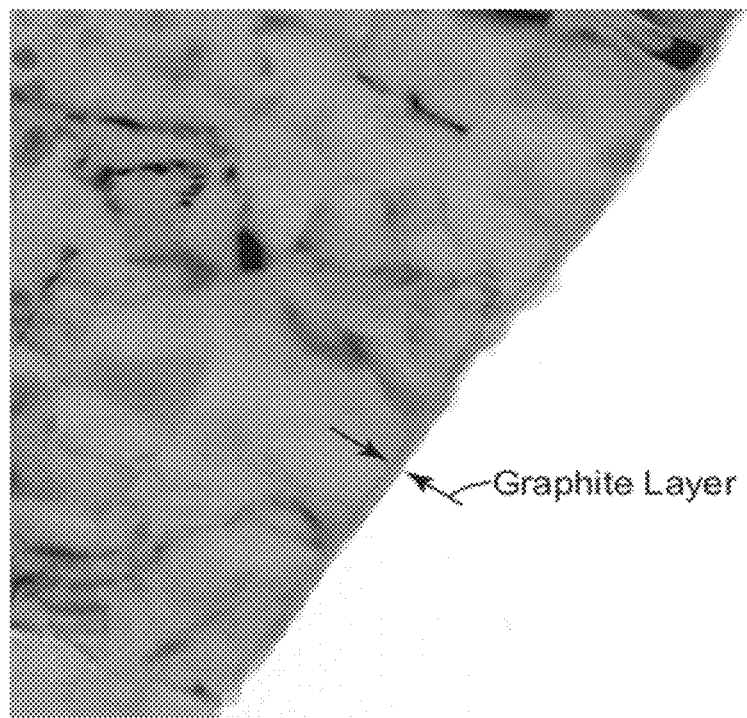

FIG. 1a is a scanning electron micrograph of a coated aluminum foil substrate that has been coated with a dry composition that includes graphite and PVDF in a 50:50 w/w ratio. The smoothest side of the aluminum foil was coated and TEM analysis shows that the thickness of the carbon (graphite) coating is about 4.1 nm in thickness. FIG. 1b is a scanning electron micrograph of a carbon coating applied using the same method as that for FIG. 1a but on the rough side of the same aluminum foil. TEM analysis shows that the thickness of this coating is around 14.7 nm.

Figure 2:
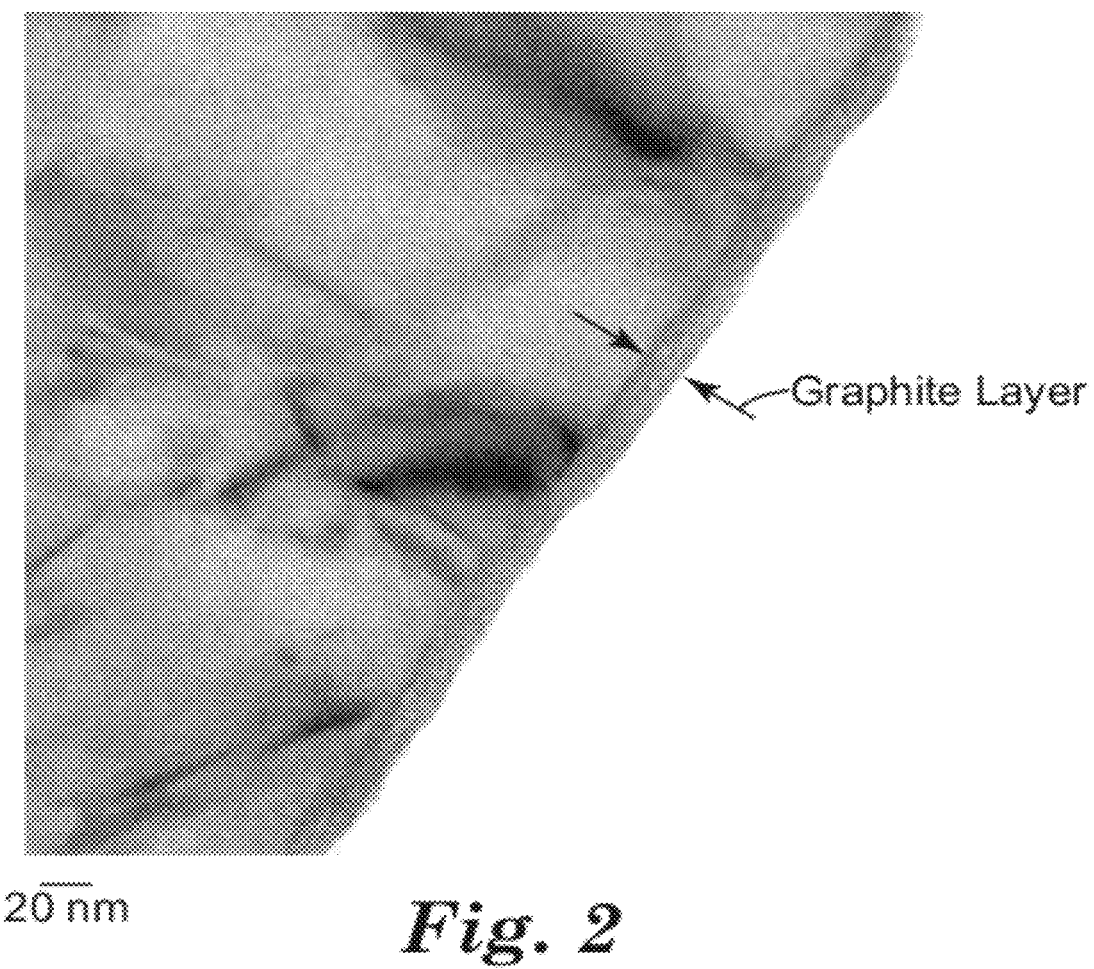
FIG. 2 is a transmission electron micrograph (TEM) of a cross-sectional view of a provided electrode after heat treatment.

FIG. 2 is a transmission electron micrograph of the same sample as in FIG. 1a but after heat treatment. This coating shows a uniform pin hole-free coating.

Objects and advantages of this invention are further illustrated by the following examples, but the particular materials and amounts thereof recited in these examples, as well as other conditions and details, should not be construed to unduly limit this invention.

EXAMPLES

Example 1

A 12.5 micron thick Al foil was placed on a clean glass plate which was kept on a sample holder with holes around the glass plate. A shop-vacuum was connected to the holes to hold the Al foil in place. HSAG300 graphite powder (available from Timcal/Timrex) was dispensed on the foil, and using a hand held Random Orbital Sander fitted with a paint pad (as described in U.S. Pat. No. 6,511,701), the powder was buffed on the foil by moving the sander back and forth with steady motion for different durations ranging from 8 to 30 seconds. Ionized air was used to blow off the excess powder around the plate and the vacuum was disconnected before removing the foil.

The coated sample was overturned on the glass plate and the process was repeated to coat the exposed side, thus coating both sides of the foil. The two sides of the foil had different roughness as shown by SEM pictures. Gentle washing with acetone did not visibly damage the coating. A two-probe surface resistivity meter (Model PSI-870, available from Prostat Corp., U. K.) was placed on all the samples after coating and all of them showed metallic conductivity range (less than $10^3$ ohms/square) regardless of the coating.

Example 2

HSAG300 graphite powder (from Timcal/Timrex) with mixed with polyvinylidene fluoride (KYNAR 741 available from Arkema, Oakville, Canada) in various weight per cent loading by mixing them in a vial with manual shaking. The resulting powder mix was used to buff coat on Al foil using the method in Example 1.

Some of the samples of Example 2 were heated in an oven in air for 5 minutes at a temperature of 175° C., at which temperature the PVDF were, and the samples were cooled to room temperature. A simple Scotch tape test was done on the samples to check the adhesion of coatings. The samples with more than 40% of PVDF did not show any delamination after the heat treatment.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references described herein are hereby incorporated by reference in their entirety.

What is claimed is:

1. A method of making a current collector comprising: providing a metallic substrate; and
    applying to the substrate without a solvent present, a dry composition including carbon particles, a binder and buffing an effective amount of said particles on said substrate at a pressure normal to the surface of greater than 0 and less than about 30 g/cm2 using an applicator pad, said applicator pad moving in a plane parallel to said surface in a plurality of directions relative to a point on the surface such that a substantially uniform coating of said particles is provided,
    and wherein said particles have a Mohs' hardness between 0.4 and 3 and a largest dimension of less than about 100 microns, and
    wherein the substantially uniform coating has a maximum average thickness of less than about 100 nanometers with a variation in thickness of no more than 10%,
    and wherein the metallic substrate is selected from aluminum, copper, magnesium, nickel, tin, and alloys thereof.

2. A method according to claim 1 wherein the particles are selected from carbon black, graphite, lamp black, and combinations thereof.

3. A method according to claim 1 wherein the substantially uniform coating has a maximum average thickness of less than about 50 nanometers.

4. A method according to claim 1 wherein the composition further comprises a binder.

5. A method according to claim 4 wherein the binder comprises polyvinylidene fluoride.

6. A method according to claim 5 further comprising heating the coated substrate to a temperature of at least 175° C. for a period of at least 5 minutes.

7. A method according to claim 1 wherein the coated substrate has a surface resistance of less than about 1000 ohms/square.

8. A lithium polymer battery comprising at least one electrode wherein the current collector is made by the method according to claim 1.

9. A battery according to claim 8 wherein the at least one electrode comprises and active material selected from $LiFePO_4$, $VO_2$, and combinations thereof.

* * * * *

UNITED STATES PATENT AND TRADEMARK OFFICE
CERTIFICATE OF CORRECTION

PATENT NO. : 8,178,241 B2  
APPLICATION NO. : 12/200044  
DATED : May 15, 2012  
INVENTOR(S) : Ranjith Divigalpitiya Page 1 of 1

It is certified that error appears in the above-identified patent and that said Letters Patent is hereby corrected as shown below:

IN THE SPECIFICATIONS:

Column 4,  
Lines 64-67, delete "30 $g/cm^2$ with an applicator which moves in an orbital fashion (preferably random orbital fashion) parallel to the surface of the substrate. This buffing operation can be carried out at a temperature below the softening temperature of the substrate." and insert the same after "about" on Col. 4, Line 63 as a continuation of the same paragraph.

IN THE CLAIMS:

Column 7,  
Line 27, in Claim 1, delete "and wherein" and insert -- wherein --.

Column 8,  
Line 26, in Claim 9, delete "and" and insert -- an --.

Signed and Sealed this  
Eleventh Day of September, 2012

David J. Kappos  
*Director of the United States Patent and Trademark Office*